United States Patent [19]
Wilkie

[11] Patent Number: 6,074,731
[45] Date of Patent: Jun. 13, 2000

[54] BIAXIALLY ORIENTED POLYPROPYLENE FILMS WITH IMPROVED COLD SEAL RECEPTIVE SURFACES

[75] Inventor: Andrew F. Wilkie, Haverhill, Mass.

[73] Assignee: Applied Extrusion Technologies, Inc., New Castle, Del.

[21] Appl. No.: 08/709,826

[22] Filed: Sep. 10, 1996

[51] Int. Cl.[7] ............................... B32B 7/12; B32B 27/32
[52] U.S. Cl. .................... 428/215; 428/336; 428/343; 428/515; 428/516; 428/517; 428/519; 428/520
[58] Field of Search ............................ 428/515, 352, 428/356, 355 FN, 355 BL, 355 AC, 336, 215, 216, 516, 517, 519, 520, 343; 525/70, 71, 78, 98, 240

[56] References Cited

U.S. PATENT DOCUMENTS

| | | | |
|---|---|---|---|
| 4,058,647 | 11/1977 | Inoue et al. | 428/474 |
| 4,298,712 | 11/1981 | Machonis, Jr. et al. | 525/74 |
| 4,370,388 | 1/1983 | Mito et al. | 428/461 |
| 4,996,096 | 2/1991 | Dew | 428/216 |
| 5,419,960 | 5/1995 | Touhsaent | 428/331 |
| 5,482,780 | 1/1996 | Wilkie et al. | 428/515 |
| 5,489,473 | 2/1996 | Wilkie | 428/323 |

*Primary Examiner*—Vivian Chen
*Assistant Examiner*—D Lawrence Tarazano
*Attorney, Agent, or Firm*—Caesar, Rivise, Bernstein, Cohen & Pokotilow, Ltd.

[57] ABSTRACT

A packaging film is provided which has a cold seal cohesive receptive skin layer made up of at least one of (A) and (B), wherein (A) is up to 100% by weight a first polymer blend, and (B) is up to 100% by weight of an optional second component. The first polymer blend is made of high density polyethylene and polyisobutylene. The second optional component is selected from (i) up to 100% by weight of styrene-butadiene copolymer, and (ii) up to 75% by weight of a functionally modified polyethylene.

17 Claims, No Drawings

BIAXIALLY ORIENTED POLYPROPYLENE FILMS WITH IMPROVED COLD SEAL RECEPTIVE SURFACES

FIELD OF THE INVENTION

The present invention relates to polyolefin films having surfaces which are especially receptive to cold seal cohesive compositions. More particularly, the present invention relates to biaxially oriented polypropylene films comprising polymeric compositions which provide cold seal receptive surfaces.

BACKGROUND OF THE INVENTION

Cold seal cohesives are becoming the seal medium of choice in today's packaging industry. Cold seals are particularly useful in wrapping products which are heat sensitive, for example, confectioneries, ice cream and bakery and dairy products. When compared to heat seal materials, cold seal cohesives offer faster packaging speeds and improved seal quality and consistency. Cold seals also have the advantage of not causing the packaging substrate to melt during an equipment shutdown or stoppage. Cold seals also provide energy and time savings associated with the operation, maintenance and control of the sealing equipment, relative to energy and time needed in the heat seal industry.

Cold seals constitute blends of natural rubber latex, e.g., cis-polyisoprene, with a synthetic polymer adhesive such as an ethylene vinyl acetate (EVA) adhesive or an acrylic adhesive. Cold seals are water-based emulsions which may contain minor ingredients such as wetting agents, stabilizers, defoamers, anti-blocks, colorants, etc.

Cold seal latexes are usually applied by either direct gravure, roller coat, spray or Meyer rod applications to a flexible packaging substrate in a pattern about ½ inch wide which surrounds the perimeter of the product to be wrapped. The volatile components of a cold seal cohesive, which mainly constitute water, are normally removed by forced hot air such that a solid layer of material between about 2 to about 4.5 pounds per ream is left on the substrate surface. The cold seal can be joined to itself, thus forming a packaging enclosure, by applying pressure for a period of time at ambient temperatures. When applied to itself, this type of closure method is commonly referred to as "cohesive" or "self" sealing.

Cold seal latexes are typically applied to a cold seal receptive surface of a laminated packaging film. In order for a cold seal latex to be useful as a closure, the emulsion must have good wetting when applied to the cold seal receptive surface, as well as strong anchorage (adhesion) when dried. In addition, the cold seal must demonstrate a strong affinity to itself (cohesion) under applied pressure for a length of time.

In the packaging industry there has been an increasing interest in obtaining improved anchorage of cold seal cohesives to receptive laminate film surfaces for the purpose of achieving stronger, particularly air-tight, closures. Hermetic packaging seals insure better package protection and shelf life by helping to keep moisture, air, and odors from entering or exiting the atmosphere surrounding a packaged product. Increasing the anchorage between the cohesive and the substrate is an important aspect for attaining a hermetic seal. Improving the hermetic quality of a package is important to achieving barrier properties necessary in today's market, particularly where low-fat and non-fat food products are becoming more prevalent.

The attainment of a secure cohesive closure is not only dependent on the factors mentioned above but also on such variables as coating weight (cohesive thickness), drying conditions, and sealing equipment and parameters including dwell time, pressure and seal jaw design and alignment. Commercially available non-cavitated biaxially oriented polypropylene (BOPP) cold seal receptive surfaces include treated ethylene-propylene random copolymer surfaces (EPRCP), ethylene-propylene block copolymer treated surfaces, acrylic coated BOPP film surfaces, untreated ethylene-propylene random copolymer surfaces, and polyvinylidine chloride (PVDC) coated surfaces. PVDC and acrylic coated films require additional coating steps which add significant costs to the resultant products. Monolayer slip-modified homopolymer polypropylene films have also been used for cold seal receptivity applications but require a printed or primed surface to ensure secure anchorage.

A need therefore exists for a cold seal receptive surface which can be extruded as a film and requires no surface treatment to attain high levels of cold seal anchorage. A need also exists for a cold seal receptive surface formulation which consists of raw materials completely approved by the United States Food and Drug Administration.

SUMMARY OF THE INVENTION

It is an object of the present invention to provide a film layer composition consisting of a polymeric blend of FDA-approved raw materials which can be extruded as a film exhibiting excellent cold seal receptivity to cold seal latexes. It is a further object of the present invention to provide a cold seal receptive film surface made of a polymeric blend which requires no surface treatment to be rendered cold seal receptive.

The present invention is based upon the discovery that unexpectedly high levels of cold seal anchorage can be attained by providing a film surface made of certain polymers and polymer blends heretofore not previously known for such application. The cold seal receptive surfaces of the present invention comprise polymeric layers preferably coextruded with a substantially thicker polyolefin core, and then monoaxially or biaxially oriented into a thin film. The polymeric layer surface may also be extrusion coated onto a polyolefin core and then mono or biaxially oriented. The oriented film surfaces of the present invention may subsequently be surface treated to enhance wet-out and adhesion properties, by treatments such as chemical, flame, electric corona discharge, or combinations thereof. However, additional surface treatment steps may be forgone according to the present invention without substantially reducing the effectiveness of the cold seal receptive surface.

According to a preferred embodiment of the present invention, the cold seal receptive surface comprises a blend of 50% by weight styrene-butadiene (SB) copolymer with 50% by weight of a second blend, which in turn comprises high density polyethylene (HDPE) at about 75% by weight and polyisobutylene (PIB) at about 25% by weight. The foregoing three-component blend delivers exceptional cold-seal adhesion to both ethylene vinyl acetate (EVA) and acrylic acid (AA) modified natural rubber cohesives. The adhesion performance of this blend shows an overall superiority compared to conventional corona-treated homopolymer polypropylene and compared to ethylene-propylene random copolymer surfaces. The three-component blend also demonstrates a very uniform surface roughness which translates to a low gloss, matte finish surface. According to the invention, it has also been discovered that the styrene-butadiene (SB) copolymer coextruded at 100% also demonstrates excellent cold seal adhesion and has relatively low haze and high gloss. However, the addition of the HDPE/PIB blend at increasing levels increases the matte finish appearance when incorporated into the styrene-butadiene resin. In addition, it has been discovered according to the invention that blends of HDPE and PIB which are further blended with functionally modified polyethylenes also yield excellent cohesive anchorage. Such functionally modified polyethylenes include ethylene acrylic acid (EAA), ethylene methacrylic acid (EMA), ethylene vinyl acetate (EVA) and ionomers such as metal salts of ethylene-methacrylic acid (ionomer).

The above-mentioned polymeric blends of the present invention also yield a hazy matte finish surface similar to the SB/HDPE/PIB skin layer blend. The surface roughness microstructure of the matte finish significantly increases the surface area of the cold seal receptive skin layer when compared to conventional homopolymer polypropylene surfaces and random copolymer surfaces. It is believed that surface roughness provides better anchorage to the cohesive latex by increasing the mechanical shearing property necessary to release the latex when the cohesive is stressed during testing or seal opening. The various polymer blend combinations, by themselves and in conjunction with various surface treatments, also provide an increased level of chemical bonding with the functionally modified component of the cohesive (i.e., EVA or AA).

The opposite surface of the cold seal receptive skin layer, or the opposite surface of a core coated on one side with the receptive layer, may include a third coextruded skin layer which functions as a bonding layer for subsequently applied inks, adhesives, polymounting, metallization, coatings, and the like including cold seal release layers.

DETAILED DESCRIPTION OF THE INVENTION

According to a preferred embodiment of the present invention, a cold seal receptive skin layer comprises about 50% by weight styrene-butadiene copolymer and about 50% by weight a blend of high density polyethylene (HDPE) and polyisobutylene (PIB). Herein the term high density polyethylene (HDPE) refers to well known high density polyethylenes and certainly encompasses polyethylenes having densities of 0.945 gms/cm$^3$ or greater. The HDPE/PIB blend preferably comprises about 75% by weight HDPE and about 25% by weight PIB. Alternatively, the skin layer may comprise from 0 to 100% by weight styrene-butadiene copolymer and from 0 to 100% by weight an HDPE/PIB blend. Depending upon the desired matte finish appearance and desired amount of gloss and haze, the amount of each component in the foregoing blends can be adjusted accordingly. The amount of HDPE and PIB in the HDPE/PIB blend may also be varied depending upon the desired properties of the resultant skin layer. While blends comprising 75% by weight HDPE and 25% by weight PIB are most preferred for some applications, HDPE/PIB blends comprising a majority of HDPE and a lesser amount of PIB are also preferred. Blends comprising between 60% and 80% by weight HDPE and between 20% and 40% by weight PIB are even more preferred.

According to another embodiment of the present invention, the cold seal receptive skin layer comprises between 25% and 100% by weight of a blend of HDPE and PIB, up to 75% by weight copolymers and terpolymers of functionally modified polyolefins, such as functionally modified polyethylenes, and up to 75% by weight ionomer such as metal salts of ethylene-methacrylic acid (ionomer). According to the foregoing formulations, any combination of ionomer and functionally modified polyolefin can be used in an amount of up to 75% by weight. As with the previously mentioned embodiment, the HDPE/PIB blend preferably contains a major amount of HDPE, with HDPE amounts of about 75% by weight being more preferred.

Regardless of which of the foregoing blends is used in the skin layer, the layer preferably comprises a majority of the blend, such that other polyolefins and components may also be included in the layer without departing from the scope of the invention. For whichever components are employed in the skin layer blend, the operative amount of each may be as low as 1.0% by weight.

The cold seal cohesive receptive skin layers of the present invention may be chemical, flame, or corona discharge treated to enhance receptivity of cold seal cohesives. Combinations of these treatments may also be used. Optional additives may also be incorporated for modifying various properties of the skin layer, including cold seal receptivity. Optional additives for the skin layer include effective amounts of inorganic slip and antiblock agents such as clays, talc, silicas and diatomaceous earth. One preferred additive is crosslinked silicone having an average particle size of between 2 and 4.5 μm, added in amounts ranging from 1000 to 10,000 ppm. Pigments may also be incorporated into the skin layer formulations.

The receptive skin layer is preferably coextruded onto a core layer or otherwise formed thereon. According to an embodiment of the invention, the core layer has a thickness of between 40 and 150 gauge. The core layer may comprise ethylene-propylene random copolymers, polybutylene homopolymers or copolymers, polyethylene homopolymers or copolymers having densities in the range of from 0.91 to 0.965 gms/in, metallocene-catalyzed polyolefin copolymers (plastomers), and blends of the foregoing monomers and polymers. In addition, the core layer may have additives incorporated therein which include, but are not limited to, amides in amounts of up to 5000 ppm, stearates in amounts of up to 5000 ppm, antistatic agents in amounts of up to 5000 ppm, pigments and cavitating agents.

According to another embodiment of the invention, the cold seal cohesive receptive layer may be formed on both surfaces of a core layer. Alternatively, a third layer, in addition to the core layer and one or more skin layers, may also be included and preferably comprises a cold seal release formulation. The cold seal cohesive receptive skin layer of the present invention may also be included in a composite film which further contains a bonding layer suitable for adhesion to printing inks, PVDC and non-PVDC adhesives, and polyethylene.

The invention may be more fully understood with reference to the non-limiting examples set forth below.

EXAMPLES

Cold seal receptive surfaces were coextruded with a base (core) layer of isotactic homopolymer polypropylene (PP) using convention ¾ inch and one inch 24 to 1 length to diameter ratio (L/D) extruders, respectively. The PP base layer was about 30 mils (0.03 inch) thick and the coextruded surface layer was about 4 mils (0.004 inch) thick for total cast sheet thickness of about 34 mils (0.034 inch). The cast sheet was cut into 2 inch by 2 inch squares and then simultaneously biaxially oriented in a T. M. Long laboratory orienting machine six (6) times its dimensional length in both the transverse and machine (extrusion) directions. The finished oriented film thickness ranged from about 0.75 mil to 0.95 mil. The coextruded cold seal receptive layer thickness was about 6 to 11 gauge. A total of 20 skin layer formulations including laboratory controls were tested and are described in Table I. The corresponding cold seal cohesive strengths for each laboratory variable and selected production BOPP film controls are presented in Table II. The corresponding film optics data are shown in Table III.

Prior to cold seal cohesive coating, the laboratory film surfaces were prepared by using electrical discharge treatment on the surface skin layer with a laboratory corona treater. The treatment parameters were set up to give a surface tension level of about 40–45 dynes/cm, measured with formamide/ethycellosolve solutions, on the homopolymer PP control surface variable [A]. The treatment parameters were held constant and used on laboratory film variables [B] through [T]. The cohesives used to illustrate the invention in Table II were cohesive (A), a general purpose water-based cohesive with vinyl acetate functionality, and cohesive (B), a water-based emulsion containing 56% by weight solids, having a density of 8.15 pds/gallon, a pH of 10.4, a viscosity of 65 cps at 77° F., and having acrylic functionality. The cohesives were applied to the corona treated cold seal receptive surface (of a single sheet of film) with a #8 Meyer (wire wound) rod. The coated sheet was immediately placed in a convection oven at 93° C. (200° F.) for 30 seconds with high air flow. The resulting dry cohesive thickness was between 20 and 30 gauge.

The dried cohesive coated sheet was allowed to cool to room temperature then the cohesive was folded over onto itself and sealed between top and bottom serrated metal jaws. The serrations were set perpendicular to the front of the sealing machine at 20 teeth per inch with a 45° angle between the teeth peaks. The tooth depth from peak to valley was about 0.2 inches. The serrated seal jaws were closed with 60 psi actual pressure for a duration of 0.5 seconds at ambient temperature. The sealed cohesive was cut into one inch strips with a precision cutter in line with the serrations. The cold seals were pulled on a tensile testing machine at 2 in./min. crosshead speed. The cohesive strength was measured at the highest point (peak value), and an average of all points in grams/inch was also computed. The measurements were taken after 24 hours ambient, and one week ambient aging.

The cohesive strength results for variables [A] through [T] are given in Table II. Included with these data are BOPP production films which are examples of state of the art uncoated cold seal receptive films. The Variable [T] control film is a commercially available film having a coextruded treated ethylene-propylene random copolymer (EPRCP) skin layer. Variables [A] and [B] homopolymer PP and EPRCP treated surfaces respectively serve as laboratory produced controls for the inventive experimental variables [C] through [S].

The homopolymer PP laboratory control Variable [A] gave ultimate cohesive seal values of 380/300 gms/in. and 430/370 gms/in. (peak/average) for cohesives (A) and (B), respectively. Variable [B] was a film having a skin layer of 3.0% $C_2$ ethylene-propylene random copolymer (EPRCP) used as a laboratory control and showed improved adhesion over Variable [A] with 600/455 gms/in. and 580/505 gms/in. values, respectively. The inventive surface of Variable [D], 100% styrene-butadiene resin, demonstrated significant adhesion improvements with cohesive (A) 775/715 gms/in. and 650/620 gms/in. with cohesive (B). The SB-resin was blended with HDPE-PIB resin at 10, 25 and 50 wt % in inventive variables [E], [F] and [G], respectively. These treated surfaces also demonstrated excellent cold seal adhesion with both cohesives and were clearly superior to the control Variable [B]. the HDPE-PIB resin was blended with an ethylene-vinyl acetate (EVA) having an 18% vinyl acetate content, at 75, 50 and 25 wt % in Variables [H], [I] and [J], respectively. The 25 wt % EVA surface yielded significantly stronger cohesive bond strengths than the control film Variable [B] at 770/725 gms/in. for cohesive (B).

The HDPE-PIB resin was then blended with a zinc salt-ethylene methacrylic acid ionomer at 25, 50 and 75 wt % to form the inventive cohesive receptive surfaces of film variables [K], [L] and [M], respectively. Variable [L] demonstrated excellent cohesive bond strengths with 690/600 gms/in. for cohesive (A) and 720/660 gms/in. for cohesive (B). The HDPE-PIB resin was blended with two other examples of functionally modified polyethylene resins: ethylene acrylic acid having a 9% by weight acrylic acid content (Variable [P]); and ethylene-methyl acrylate having a 21% by weight methyl acrylic content (Variable [Q]). Film Variable [Q] demonstrated significantly enhanced adhesion to the acrylic modified cohesive (B) versus the control with 700 gms/in. Film Variable [P] was 90 gms/in. better than the control film with cohesive (A), at 545 gms/in.

The HDPE-PIB resin was further blended with two combinations of functionally modified polyethylene: Variable [R], which contained 20% EVA and 20% EAA; and Variable [S], which contained 20% EVA and 20% ionomer. The combination in Variable [R] yielded adhesion values about equal to the control film. The Variable [S] combination, however, demonstrated significant adhesion improvement with cohesive (B). Optics data for the control film (A) and (B) and inventive films (C) thru (S) are shown in Table III. All the inventive films demonstrated high haze and low 45° gloss with various degrees of matte-finish. The most uniform matte finish films were Variables (E), (F), (G), (I), (L), (Q), (R) and (S). The matte finish is useful for achieving a paper-like finish in a packaging film.

TABLE I

| | Cold Seal Receptive Skin Layer Formulations | | | | | | | |
|---|---|---|---|---|---|---|---|---|
| Variable | PP[1] | RCP[2] | HDPE-PIB[3] | S-B[4] | EVA[5] | EAA[6] | EMA[7] | Ionomer[6] |
| A | 100 | — | — | — | — | — | — | — |
| B | — | 100 | — | — | — | — | — | — |
| C | — | — | 100 | — | — | — | — | — |
| D | — | — | — | 100 | — | — | — | — |
| E | — | — | 90 | 10 | — | 100 | — | — |
| F | — | — | 75 | 25 | — | — | — | — |
| G | — | — | 50 | 50 | — | — | — | — |

TABLE I-continued

Cold Seal Receptive Skin Layer Formulations

| Variable | PP[1] | RCP[2] | HDPE-PIB[3] | S-B[4] | EVA[5] | EAA[6] | EMA[7] | Ionomer[6] |
|---|---|---|---|---|---|---|---|---|
| H | — | — | 25 | — | 75 | — | — | — |
| I | — | — | 50 | — | 50 | — | — | — |
| J | — | — | 75 | — | 25 | — | — | — |
| K | — | — | 75 | — | — | — | — | 25 |
| L | — | — | 50 | — | — | — | — | 50 |
| M | — | — | 25 | — | — | — | — | 75 |
| N | — | — | — | 75 | 25 | — | — | — |
| O | — | — | — | 75 | — | — | — | 25 |
| P | — | — | 75 | — | — | 25 | — | — |
| Q | — | — | 75 | — | — | — | 25 | — |
| R | — | — | 60 | — | 20 | 20 | — | — |
| S | — | — | 60 | — | 20 | — | — | 20 |

[1] Isotactic homopolymer polypropylene 2.0 gms/10 minutes, 2360 gms, 230° C. MFR
[2] 3.0 wt % $C_2$ Ethylene-Propylene Random Copolymer
[3] High Density Polyethylene-Polyisobutylene Blend
[4] Styrene-Butadiene Copolymer
[5] Ethylene Vinyl Acetate (18% Vinyl Acetate)
[6] Ethylene Acrylic Acid (9% Acrylic Acid)
[7] Ethylene Methyl Acrylate
[8] Zinc Salt - Ethylene Methacrylic Acid 14.0 MFR

TABLE II

Cohesive Strength (Peak/Avg.)[1] (gms/in.)

| | Cohesive A[2] | | Cohesive B[3] | |
|---|---|---|---|---|
| Variable | 24 Hours Aged | 1 Week Aged | 24 Hours Aged | 1 Week Aged |
| A | 415/370 380/360 | 380/300 | 415/365 420/370 | 430/370 |
| B | 590/475 | 600/455 | 580/525 | 580/505 |
| C | | | | |
| D | 780/755 | 775/715 | 630/585 | 650/620 |
| E | 680/640 | | 780/740 | |
| F | 790/730 | | 870/800 | |
| G | 620/575 | 630/605 | 665/635 | 750/690 |
| H | 480/360 | | 630/670 | |
| I | 450/440 | | 630/590 | |
| J | 630/560 | 500/470 | 805/755 | 770/725 |
| K | 595/560 | 635/525 | 670/635 | 570/555 |
| L | 690/640 | | 720/660 | |
| M | 590/500 | | 530/480 | |
| N | 570/515 | 610/405 | 565/535 | 520/480 |
| O | 745/700 | 640/575 | 465/445 | 460/425 |
| P | 560/550 | 600/545 | 510/540 | 560/535 |
| Q | 570/495 | 645/465 | 740/690 | 745/700 |
| R | 535/460 | 535/460 | 590/540 | 615/550 |
| S | 635/555 | 615/510 | 675/610 | 750/660 |
| T[4] | 520/460 | | 390/370 | |

[1] Ambient Serrated jaws/0.5 second dwell/70 psi, pulled at 2 in./min.
[2] Cohesive A = EVA modified general purpose water-based cohesive with vinyl acetate functionally
[3] Cohesive B = Acrylic Acid modified cohesive.
[4] 115 gauge commercially available coextruded treated film having skin layer of ethylene propylene random, copolymer.

TABLE III

Optics Data

| Variable | % Haze | Gloss Units (45%) |
|---|---|---|
| A | 0.4 | 95 |
| B | 0.4 | 94 |
| C | — | — |
| D | 6.0 | 90 |
| E | 64 | 15 |
| F | 66 | 10 |
| G | 66 | 11 |
| H | 37 | 29 |
| I | 54 | 16 |
| J | 46 | 23 |

TABLE III-continued

Optics Data

| Variable | % Haze | Gloss Units (45%) |
|---|---|---|
| K | 46 | 20 |
| L | 61 | 14 |
| M | 28 | 46 |
| N | 25 | 37 |
| O | 38 | 24 |
| P | 47 | 18 |
| Q | 55 | 15 |
| R | 53 | 16 |
| S | 52 | 16 |

Although the present invention has been described in connection with preferred embodiments, it will be appreciated by those skilled in the art that additions, modifications, substitutions and deletions not specifically described may be made without departing from the spirit and scope of the invention defined in the appended claims. For example, although the packaging films of the invention have been described in terms of one, two or three layer films, it is to be understood that films having additional layers such as a metallized layer or other polymeric layer are also within the scope of the present invention.

What is claimed is:

1. An extruded film comprising an improved cold seal cohesive receptive skin layer, said skin layer comprising one or both of component A and component B wherein
   (i) component (A) comprises a polymer blend of high density polyethylene and polyisobutylene, and
   (ii) component (B) comprises styrene-butadiene copolymer, alone or in combination with up to 75%, by weight of component B, of at least one member selected from the group consisting of ethylene acrylic acide copolymer, ethylene methacrylic acid copolymer, ethylene vinyl acetate copolymer, and metal salts of ethylene methacrylic acid copolymer; and
   a cold seal cohesive is applied to said skin layer.

2. A film as in claim 1, wherein said skin layer has a thickness of between 1 and 20 gauge.

3. A film as in claim 1, wherein said skin layer comprises said component (B).

4. A film as in claim 1, wherein both said components (A) and (B) are present in said skin layer.

5. A film as in claim 1, wherein said components (A) and (B) are present in said skin layer and component (B) comprises said at least one member selected from the group consisting of ethylene acrylic acid copolymer, ethylene methacrylic acid copolymer, ethylene vinyl acetate copolymer, and metal salts of ethylene methacrylic acid copolymer.

6. A film as in claim 1, wherein said skin layer comprises said component (B) (i) in an amount of 100%.

7. A film as in claim 3, wherein said skin layer comprises component (A) and component (A) comprises more than 50% by weight of high density polyethylene and less than 50% by weight of polyisobutylene.

8. A film as in claim 7, wherein said high density polyethylene is present in an amount of about 75% by weight based on the total amount of said component (A).

9. A film as in claim 1, wherein said film further comprises a core layer and said skin layer is formed on a side of said core layer.

10. A film as in claim 9, wherein said core layer has a thickness of between 40 and 150 gauge.

11. A film as in claim 9, wherein said core layer comprises isotactic polypropylene.

12. A film as in claim 9, wherein said film further comprises a second skin layer, said second skin layer being formed on a side of said core layer opposite the side having said receptive skin layer formed thereon.

13. A film as in claim 12, wherein said second skin layer has a thickness of between 1 and 20 gauge.

14. A film comprising:
   a core layer selected from the group consisting of ethylene-propylene random copolymer, polybutylene homopolymer, polyethylene homopolymer, metallocene-catalyzed polyolefin copolymer, and isotactic polypropylene homopolymer;
   a cold seal cohesive receptive skin layer, said skin layer comprising (A) and (B), wherein:
   (A) is a first polymer blend comprising high density polyethylene and polyisobutylene; and
   (B) is at least one member selected from the group consisting of (i) styrene-butadiene copolymer, and (ii) ethylene acrylic acid copolymer, ethylene methacrylic acid copolymer, ethylene vinyl acetate copolymer, and metal salts of ethylene methacrylic acid copolymer present in an amount of up to 75% by weight of component (B); and
   a cold seal is cohesive applied to said skin layer.

15. A film as in claim 14 wherein said core layer is isotactic polypropylene homopolymer.

16. A film as in claim 14, wherein said skin layer comprises about 50% by weight of said component (B), said component (B) is styrene butadiene copolymer and about 50% by weight of said component (A).

17. A film as in claim 16, wherein said component (A) comprises about 75% by weight high density polyethylene based on the total amount said of component (A).

* * * * *